United States Patent [19]

Hitney et al.

[11] 4,125,893
[45] Nov. 14, 1978

[54] INTEGRATED REFRACTIVE EFFECTS PREDICTION SYSTEM

[75] Inventors: Herbert V. Hitney; Juergen H. Richter, both of San Diego, Calif.; Murray H. Schefer, Silver Spring, Md.

[73] Assignee: The United States of America as represented by the Secretary of the Navy, Washington, D.C.

[21] Appl. No.: 781,243

[22] Filed: Mar. 25, 1977

[51] Int. Cl.² .............................................. G06F 9/06
[52] U.S. Cl. ................................................... 364/300
[58] Field of Search ... 364/200 MS File, 900 MS File, 364/300

[56] References Cited

PUBLICATIONS

Pitts, David E., "A Computer Program for Calculating Model Planetary Atmospheres", NASA Manned Spacecraft Center, Sept. 1967, pp. 1-60, L71402286.

Primary Examiner—Raulfe B. Zache
Attorney, Agent, or Firm—R. S. Sciascia; G. J. Rubens; T. M. Phillips

[57] ABSTRACT

A method and means of assessing the effects of the lower atmosphere on the performance capabilities of a variety of electromagnetic systems. Environmental data is entered manually into a computer by means of a keyboard or on digital tapes in cassette form. A mathematical model is selected and will generate the type of display desired when the required information and a specific electromagnetic system of interest is selected. A display will appear on the graphics-display screen from which hard copies can be made for use in deploying and making tactical decisions as to stationing of assets.

9 Claims, 8 Drawing Figures

PROPAGATION CONDITIONS SUMMARY

LOCATION: 3200 N 117 54 W
TIME: 30 JUNE 76 0030Z

SURFACE TO SURFACE:
 EXTENDED RANGES AT ALL FREQUENCIES

SURFACE TO AIR:
 EXTENDED RANGES FOR ALTITUDES UP TO 319 METERS
 POSSIBLE HOLES FOR ALTITUDES ABOVE 319 METERS

AIR TO AIR:
 EXTENDED RANGES FOR ALTITUDES UP TO 319 METERS
 EXTENDED RANGES FOR ALTITUDES BETWEEN 5686 AND 5756 METERS
 POSSIBLE HOLES FOR ALTITUDES BETWEEN 319 AND 5686 METERS
 POSSIBLE HOLES FOR ALTITUDES ABOVE 5756 METERS

*FIG. 4*

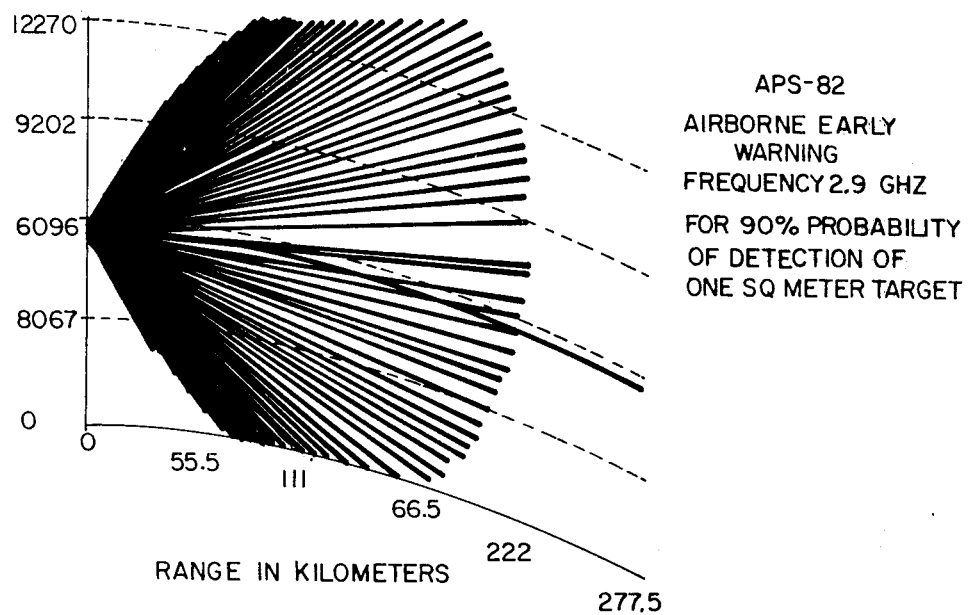

APS-82

AIRBORNE EARLY WARNING

FREQUENCY 2.9 GHZ

FOR 90% PROBABILITY OF DETECTION OF ONE SQ METER TARGET

LOCATION: 3200 N 117 54 W
TIME: 30 JUNE 76 0030Z
SENSOR HEIGHT = 5670 M

*FIG. 5*

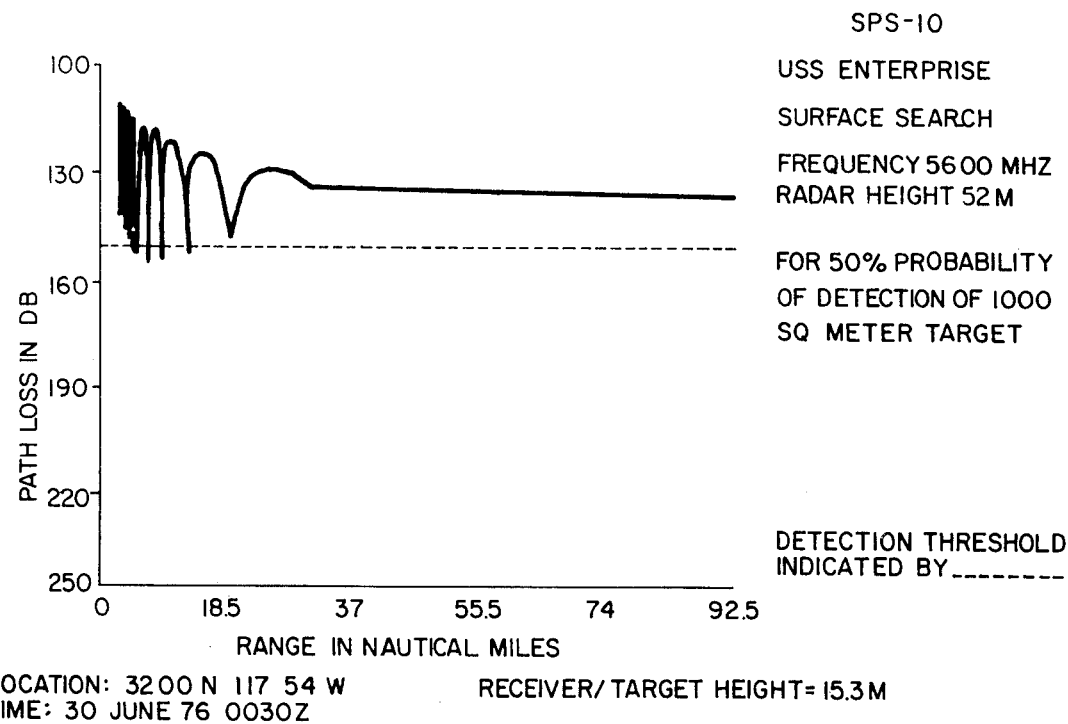

*FIG. 6*

HISTORICAL PROPAGATION CONDITIONS SUMMARY

LOCATION: 3200 N 120 W
SEASON: SUMMER
TIME: DAY & NIGHT

SURFACE TO SURFACE:

41% PROBABILITY OF EXTENDED RANGES FOR FREQUENCIES 30 MHZ TO 1 GHZ
   42% PROBABILITY OF EXTENDED RANGES FOR FREQUENCIES 1 GHZ TO 3 GHZ
   43% PROBABILITY OF EXTENDED RANGES FOR FREQUENCIES 3 GHZ TO 6 GHZ
   59% PROBABILITY OF EXTENDED RANGES FOR FREQUENCIES 6 GHZ TO 10 GHZ
   69% PROBABILITY OF EXTENDED RANGES FOR FREQUENCIES ABOVE 10 GHZ

SURFACE TO AIR:

29% PROBABILITY FOR:
     EXTENDED RANGES UP TO MEDIAN ALTITUDE OF 130 METERS
     POSSIBLE HOLES ABOVE MEDIAN ALTITUDE OF 130 METERS

AIR TO AIR:

40% PROBABILITY FOR:
     EXTENDED RANGES FOR MEDIAN ALTITUDES BETWEEN 446 AND 606 METERS
     POSSIBLE HOLES FOR MEDIAN ALTITUDES ABOVE 606 METERS

*FIG. 8*

INTEGRATED REFRACTIVE EFFECTS PREDICTION SYSTEM

BACKGROUND OF THE INVENTION

Electromagnetic radio propagation in the lower atmosphere often exhibits unexpected behavior created by non-standard distributions of the radio refractivity of the atmosphere. The basic cause and effect have been understood since the 1940's and over the past four decades numerous techniques have been developed in an attempt to assess such effects as they occur. Generally, these techniques have proven either too complicated or too cumbersome for tactical military operations because of the amount of data handling that is required or because of the inherently involved atmospheric and propagation physics models that must be used for proper assessments.

SUMMARY OF THE INVENTION

The present invention provides a method and means for acquiring, converting and interpreting refractivity data and will display their effects on specific sensor and weapons systems in near real time. Displays can be generated which show the refractivity structure, summarize their effects on wide classes of equipment, and indicate path loss versus range or actual detection range versus altitude for specific electromagnetic systems. A comprehensive world-wide climatology of refractive effects is available "on-line" to augment the on-scene refractivity data. A combination of ray optics, simplified full-wave and imperical propagation models are employed for calculations in both the line-of-sight and over-the-horizon regions. The models account for effects from both the evaporation duct and other refractive structures and have been validated by data from carefully conducted radio-meteorological experiments.

Accordingly, an object of the present invention is the provision of a method of presenting refractivity data such that it is readily usable and easily interpreted.

Other objects, advantages and novel features of the invention will become apparent from the following detailed description of the invention when considered in conjunction with the accompanying drawings.

BRIEF DESCRIPTION OF THE DRAWINGS

FIG. 4 shows a display of a propagation condition summary in narrative form.

FIG. 5 is a ray-trace display for the refractivity conditions as shown in FIG. 3 for a specific electromagnetic system.

FIG. 6 is a display of a presentation of a propagation or path loss versus range.

FIG. 8 shows a historical propagation conditioned summary for a specific geographical area.

DESCRIPTION OF THE PREFERRED EMBODIMENT

Figure 1:
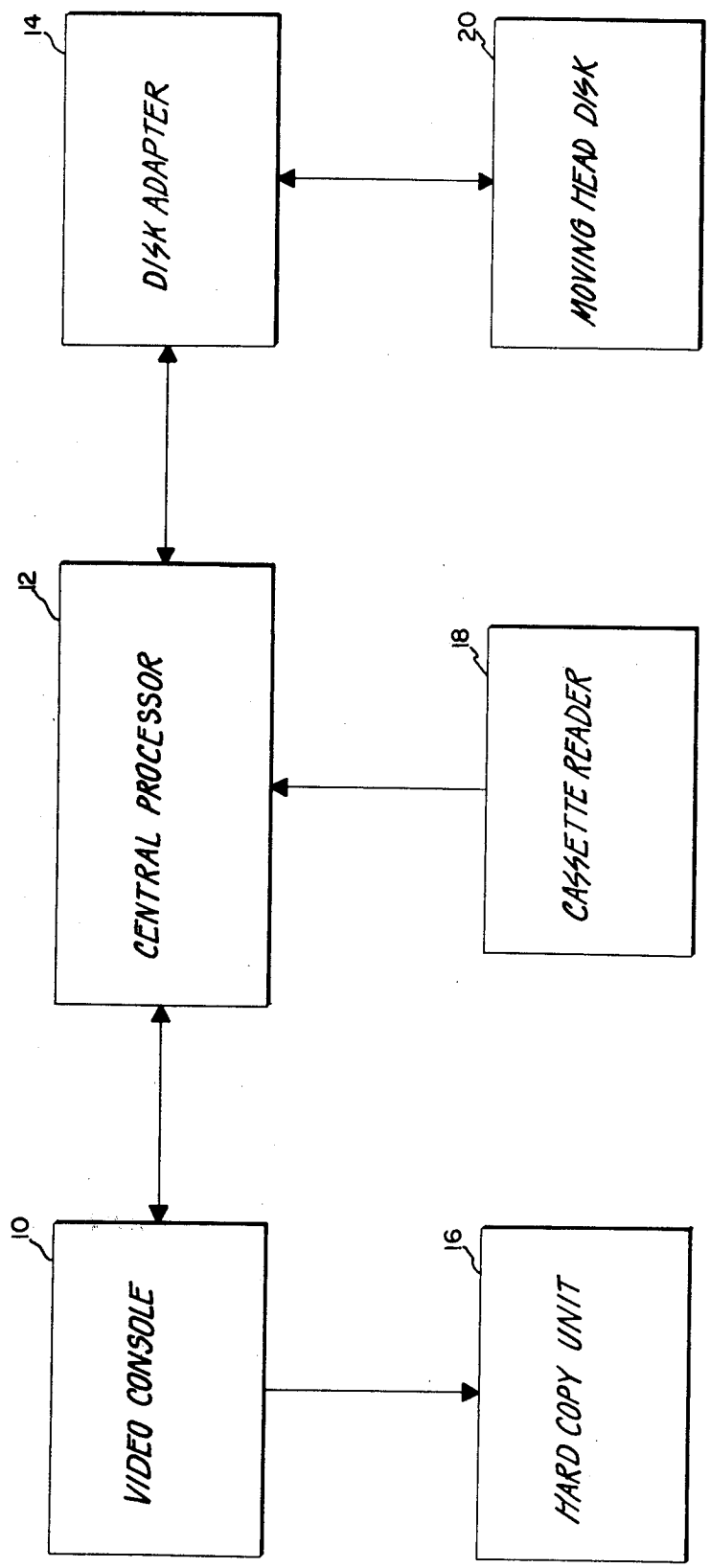
FIG. 1 is a generalized block diagram of the invention.

Referring now to the drawings wherein there is shown in FIG. 1, in block diagram form, the integrated refractive effects prediction system. The system consists of a general processor 12 which may be a Data General Nova 8001, 32K words core memory and hardware floating point controlled by a video console 10 and a disc adapter 14. Video console 10 may be a Tektronix 4012 alphanumeric/graphic keyboard entry and disc adapter may be of the Data General 4046 type. In the embodiment shown central processor 12 has 32,768 16-bit words of core memory and is supported by 2.5 million words of on-line disc storage 20. The interactive graphic display terminal 10 on which the operator is queried by the program for required inputs and on which the results are displayed; data may be entered either manually through the keyboard of console 10 or on digital tapes in cassette form from cassette reader 18. A hard copy unit 16 is to provide prints of the information on the graphic display terminal and may be of the Tektronix 4610 type.

Figure 2:
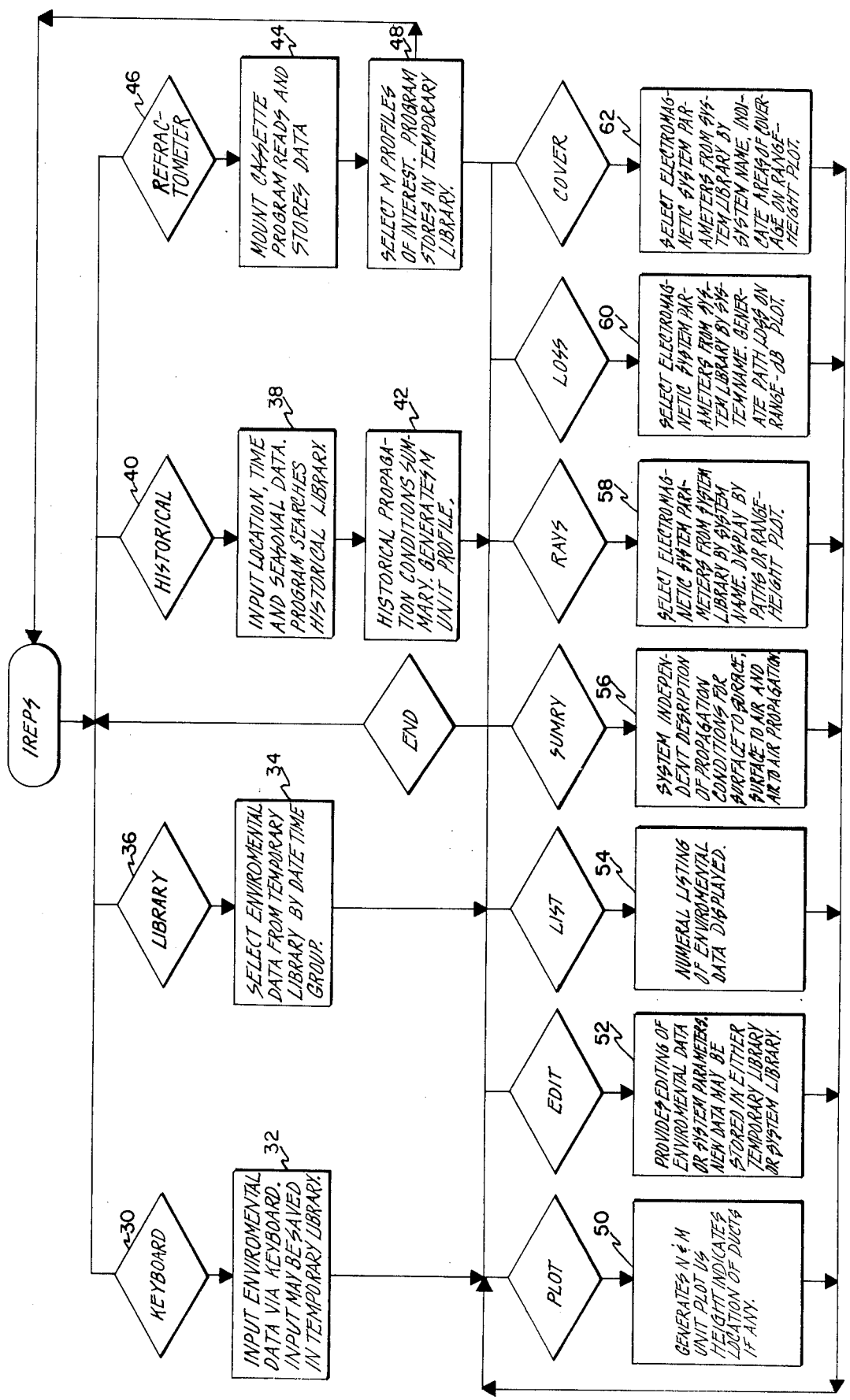
FIG. 2 is a flow diagram of the method embodying the invention.

FIG. 2 shows the information flow in block diagram form. Information may be entered into the system from the keyboard 30, temporary library 36, historic and geographic refractivity library 40 and refractometer 46. The information from refractometer 46 or keyboard 30 is on-scene refractivity profiles measured either by radiosonde (meteorological balloon) or microwave refractometer (instrument carried by aircraft which measures refractivity directly) and are necessary for reliable in situ assessments. The stored information in historical library 40 consists of a refractivity library containing long-term meteorological statistics on the occurrence of ducting conditions as a function of geographic location and season, and a library of system parameters of the sensors whose performance is to be assessed.

Figure 3:
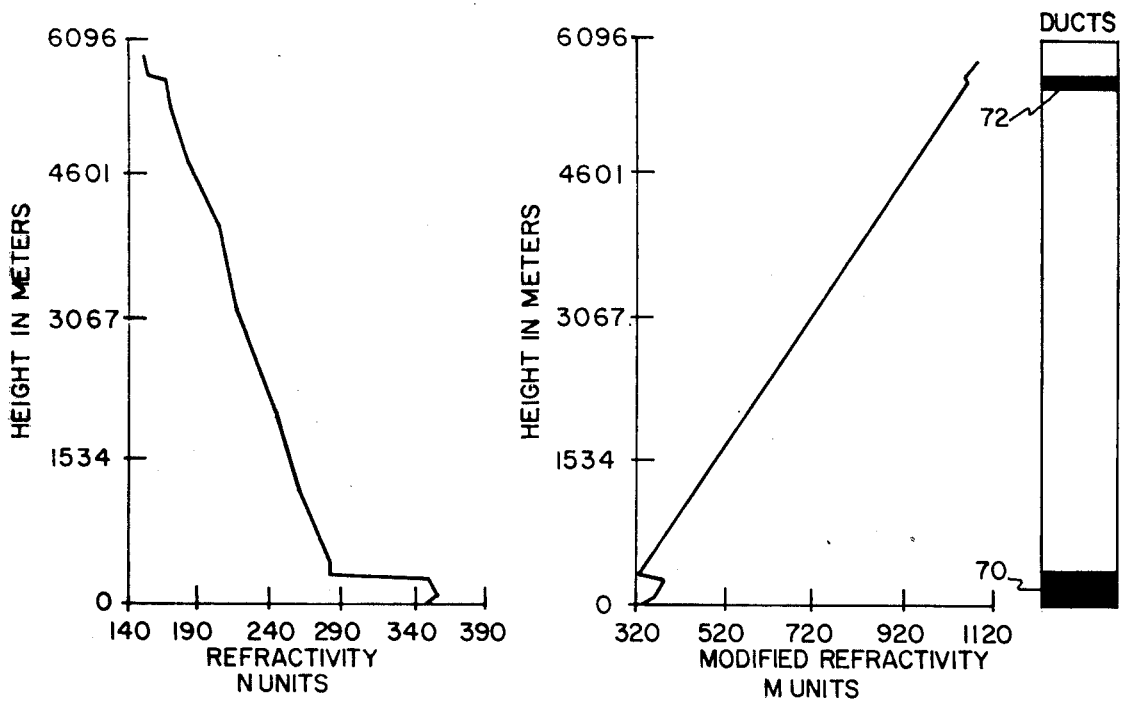
FIG. 3 shows a display of refractivity profiles calculated from radiosonde data.

The following samples of integrated refractive effects prediction system displays are presented to illustrate the concepts and capability of the products outlined in FIG. 2. FIG. 3 shows a display of refractivity profiles calculated from radiosonde data. In this case the computer accepts the atmospheric data consisting of temperature, relative humidity, and pressure readings and converts it into both N and M units. N units (usually referred to as "refractivity") are defined to be $N = (n-1) \times 10^6$ where $n$ is the refractive index (defined as the ratio of the velocity of an electromagnetic wave in vacuum to the velocity in the atmosphere). The "modified refractivity", M, is a transformation that forces the earth's surface to be flat by introducing a curvature term to the refractivity profile ($M = N + (h/a) \times 10^6$, ($a$ = earth's radius, $h$ = height above the surface) which preserves the relative curvature between the normal of the electromagnetic wave front and the surface.

Whenever the M curve has a relative minimum, a duct is formed. The base of an elevated duct is the height on the M curve below the relative minimum that has the same M value as the relative minimum. When no such height exists, the base of the duct is at the ground and a so-called ground-based duct is formed. The presence, location, and thickness of both ground-based and elevated ducts are displayed in a vertical bar labeled "Ducts" to the right of the M curve in the refractivity profile display. The duct bar is displayed only when there is at least one duct formed. In FIG. 3 there is shown both a surface-based duct 70 and an elevated duct 72. Also shown in the display is the height of the evaporation duch which is a low-level duct caused by evaporation from the sea surface. Evaporation ducting conditions can be conveniently described by parameter duct height which is the height at which the M curve reaches a minimum value. The height scale in FIG. 3 does not permit the display of the M curve behavior in the first tens of feet above the surface in which evaporation plays a role. Therefore evaporation duct height is indicated numerically in the lower right hand corner of the refractivity profile plot. The evaporation duct height is calculated using different models depending on the temperature structure in the boundary layer. Models which may be used are described by H. Jeske in "The State of Radar Range Prediction Over Sea", Tropospheric Radio Wave Propagation, Part ii, NATO-AGARD Conference Proceedings p 70–71, (February 1971).

Labels for location and time for any of the types of profile input are optional. The units of height can be selected at the beginning of the input routine to be either feet or meters which will be carried through for all inputs and displays. The refractometer data can be entered on the terminal keyboard 30 (FIG. 2) or on a magnetic tape cassette reader 44 (FIG. 2) which is compatible with the refractometer recorders available. Information provided from the refractometer cassette is N units and altitude. N units or M units versus height from any source can be entered on the keyboard. Since it might be desirable to reexamine some earlier profile, provision is made to store temporarily in library 36 and recall profiles by unique file name. In this way it is possible to study the effects from changes in the refractivity structure without re-entering profiles. After entering a profile (mathematical model) and other descriptive factors into the system and displaying the profiles, it may be desirable to change one or more parameters. A comprehensive editing procedure allows the operator to change only one element of the many inputs without requiring much effort or affecting any of the other inputs. The editing routine displays the value of all pertinent inputs 52 (FIG. 2) and accepts changes to those that can be changed. Changes are screened so as to allow only valid and reasonable changes. Based on the refractivity information shown in FIG. 3 a propagation condition summary in narrative form is provided and is shown in FIG. 4. This summary is general and not dependent on a specific system. Three categories are considered in this summary, namely surface-to-surface, surface-to-air, and air-to-air coverage.

Ray optics models are used to generate so-called ray trace diagrams. The ray optics models are based on ray tracing concepts where the physical path of each ray is calculated and displayed. This system is capable of producing ray trace presentations which provide a qualitive picture of propagation anomolies. FIG. 5 is a ray trace display for the refractivity conditions as shown in FIG. 3 for an airborne early warning radar, APS-82, operating at 5670 meters. This ray trace display is a curved-earth range-height plot and shows the path that electromagnetic energy takes for various elevation angles at the radar. Such a display indicates the areas in space that detection of targets can and cannot be expected. For example, there is shown extended detection ranges out to 277.5 kilometers at altitudes near 5670 meters and reduced ranges or a "radar hole" at altitudes above 5670 meters.

Another display is the presentation of propagation or path loss versus range. Path loss is defined as the logarithmic ratio (in dB) of transmitted-to-received power assuming isotropic antennas. An example of such a path loss versus range plot for the refractivity conditions of FIG. 3 is shown in FIG. 6. The only parameters which the operator must specify are the receiver or target height and the system for which this display is to be generated. The display of FIG. 6 is for an SPS-10 surface-search radar assumed to be located at a height of 52 meters looking at a target at a height of 15.3 meters. The dotted line, at a path loss value of 153 dB, is the 50% probability of detection threshold for the SPS-10 for a 1,000 square meter target. Path loss values above this line permit target detection while path loss values below this curve (or larger than 153 dB) are below the detection threshold for this radar. The target in this case can be detected over the entire range out to 50 nautical miles.

Figure 7:
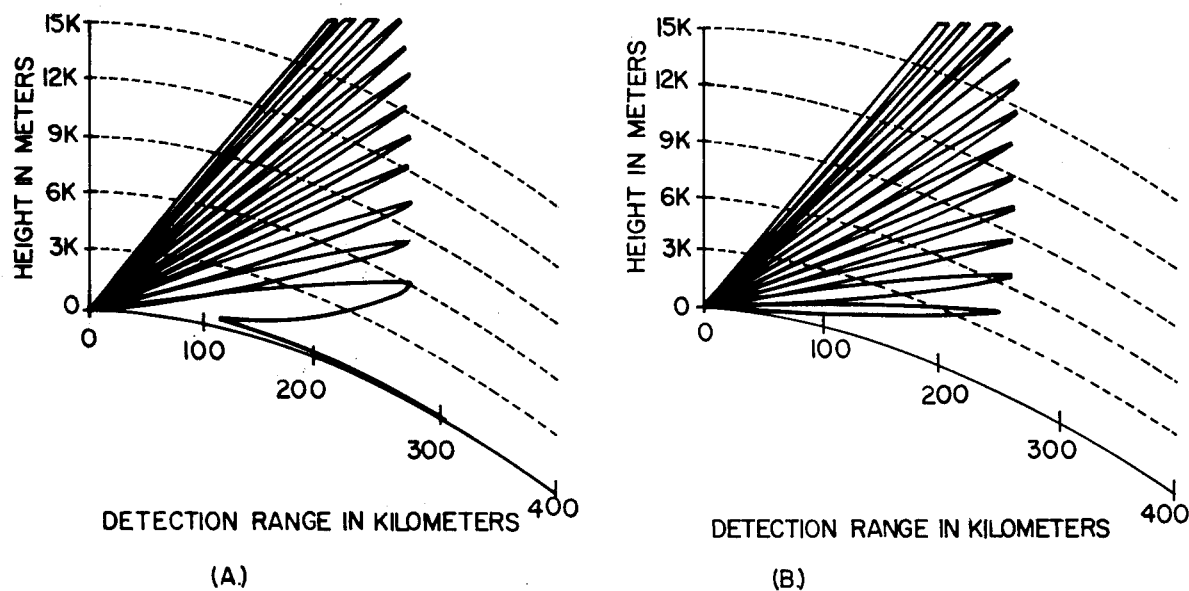
FIG. 7 is a display of detection range as a function of altitude for a specific surveillance, communications, electronic warfare, or weapons system for the refractivity conditions of FIG. 3.

The display of FIG. 7 is a coverage diagram which displays detection range as a function of altitude for any specific surveillance, communications, electronic warfare, or weapons system. FIG. 7a is a vertical coverage display showing detection range versus altitude for the SPS-12 air-search radar for the refractivity conditions of FIG. 3 and FIG. 7b is a vertical coverage display showing detection range versus altitude for the SPS-12 air-search radar in the absence of any surface-base duct. Except for non-standard values of the radar parameters such as transmitter power, receiver sensitivity, polarization, etc. all the operator has to do is to identify the radar system by its name. The detection range envelope can be generated for various values of probability of detection and target cross-section. In the displays shown the detection range envelope defines the location at which a one square meter target has a 90% probability of being detected.

Both path loss curves and detection range envelopes are based on several mathematical models. In the interference or line-of-sight region the ray optics models of calculating the interference pattern is used. Beyond the horizon defraction models, evaporation duct models, ducting due to elevating layers models, and troposcatter models are included. All the models are carefully checked against propagation measurements taken under wall controlled conditions for validation. The ray optics model is based upon ray tracing concepts where the optical path length of each ray is calculated. The optical path length difference between direct and reflected rays can then be determined with calculations of the reflection coefficient of the sea as modified by surface roughness and calculations of possible focusing or divergence by refractive layers, it is then possible to calculate the interference pattern in the optical region. Waveguide theory was used to model propagation loss as disclosed by H. V. Hitney "Propagation Modeling in the Evaporation Duct", Naval Electronics Laboratory Center, TR-1947 (April 1975).

FIG. 8 shows a historical propagation conditioned summary for the San Diego, Calif. off-shore area for summer day and night combined. This display indicates the probabilities of extended, normal, or reduced ranges occurring for various frequencies and altitudes. Surface-to-surface, surface-to-air, and air-to-air conditions are listed separately. Information for these summaries are obtained by air observations from radiosonde stations around the world in or near ocean areas, and by surface meteorological observations collected by major vessels in selected ocean areas. This information is stored in the historical library and upon specification of a latitude, longitude, season, and time of day the system will search the historical files for the most appropriate data and present a historical propagation condition summary as shown in FIG. 8.

Any of the presentations displayed on the scope of the console may be made into a hard copy for use by the consumer.

Obviously many modifications and variations of the present invention are possible in the light of the above teachings. It is therefore to be understood that within the scope of the appended claims the invention may be practiced otherwise than as specifically described.

What is claimed is:

1. The method of assessing the influence of the atmospheric environment from sea level to eight kilometers above sea level on the performance capabilities of a variety of electromagnetic systems comprising the steps of:
   a. storing the system parameters for said variety of electromagnetic systems in the memory of a computer,
   b. storing mathematical models of the types of displays desired in the computer memory,
   c. entering near-real time atmospheric environmental data into the computer,
   d. selecting from the stored mathematical models the type of display desired,
   e. selecting the system parameters of a specific electromagnetic system from said stored system parameters and
   f. observing on a video console the selected display of the performance capabilities of the selected electromagnetic system.

2. The method of claim 1 wherein said display is a graph of the low atmospheric refractive conditions including any ducts that may be present.

3. The method of claim 1 wherein said display is a plain language print-out of a propagation conditions summary of the low atmospheric refractive conditions.

4. The method of claim 1 wherein said display is a plain print-out of a historical propagation condition summary for a specific geographical area and specific time of the year.

5. The method of claim 1 wherein said display is a graph showing detection range versus altitude for a selected electromagnetic system against a selected target.

6. The method of claim 1 wherein said display is a graph of path loss versus range for a selected electromagnetic system.

7. The method of claim 1 wherein said display is a graph of a ray-trace for a selected electromagnetic system.

8. The method of assessing the influence of the atmospheric environment from sea level to eight kilometer above sea level on the performance capabilities of a variety of electromagnetic systems comprising the steps of:
   a. collecting low atmospheric environmental data for different geographical areas of the ocean for different seasons of the year,
   b. storing said collected data in the memory of a computer,
   c. storing mathematical models of the types of displays desired in the computer memory,
   d. storing the system parameters for said variety of said electromagnetic systems into the computer,
   e. selecting from the stored mathematical models the type of display desired,
   f. selecting the system parameters of a specific electromagnetic system,
   g. selecting atmospheric environmental data for a specific geographical area of the ocean for a specific season of the year,
   h. observing on a video console the selected display of the performance capabilities of the selected electromagnetic system for the geographical area and season selected.

9. The method of claim 8 wherein said environmental data consists of refractivity data.

* * * * *